UNITED STATES PATENT OFFICE.

WILLIAM M. LINDSAY AND GERARD O. KALB, OF ST. LOUIS, MISSOURI.

IMPROVEMENT IN FIRE-BRICKS.

Specification forming part of Letters Patent No. 149,589, dated April 14, 1874; application filed February 26, 1874.

*To all whom it may concern:*

Be it known that we, WILLIAM M. LINDSAY and GERARD O. KALB, both of St. Louis, county of St. Louis, and State of Missouri, have invented an Improved Fire-Brick, of which the following is a specification:

This invention consists in the use of silicate of alumina, a native rock usually termed "sand-rock," and "silicite of alumina," (ordinary fire-clay,) molded and burned for the manufacture of fire-brick, furnace-linings, retorts, and similar articles.

In order that the silicate of alumina (sand-rock) we use in carrying out our invention may be determined, we herewith give the following analysis of a specimen: The silicate of alumina we use contains, in 100 parts, silica 77.5, alumina 19.0, iron 1.3, moisture 1.6, (loss 6.) The aforesaid silicate of alumina (sand-rock) and silicite of alumina (fire-clay) are the materials that compose our fire-brick, and its manner of manufacture is as follows: The silicite of alumina (fire-clay) is ground in its natural state to a pulverized condition. The silicate of alumina (sand-rock) is also broken, but merely to a granulated state. The proportion of each ingredient used is that of fifty parts of silicate of alumina to fifty parts of silicite of alumina. The pulverized silicite of alumina (fire-clay) and granulated silicate of alumina, (sand-rock,) in above proportions, are then mixed together, and tempered with water to a proper consistency. In this mixed condition we pass the mixture through a pug-mill, in order to thoroughly mix the clay and rock; next mold it, pile it up, and pack up to dry. Before it is completely dry we compress the mixture in a press, and give it a proper shape of the mold. Then pile it up again till it is thoroughly dry; finally it is put in a kiln and burned.

To make an article of fire-brick requiring a severer test of fire, we increase the proportion of silicate of alumina, (rock,) and decrease the silicite of alumina, (clay.)

The silicate of alumina, as above stated, has no lime, nor any component parts that will flux under the same heat that would melt a common fire-brick; hence we produce an article of fire-brick possessing superior advantages, and capable of withstanding a greater degree of heat than fire-bricks produced by the ordinary manner of manufacture.

What we claim is—

The fire-brick composed of the silicate of alumina and silicite of alumina, in the proportions substantially as described.

In testimony of said invention, we have hereunto set our hands in presence of witnesses.

WILLIAM M. LINDSAY.
GERARD O. KALB.

Witnesses:
WILLIAM M. HERTHEL,
CHAS. F. MEISNER.